United States Patent [19]

Baur et al.

[11] 4,417,980

[45] Nov. 29, 1983

[54] FILTRATION APPARATUS

[75] Inventors: Rolf Baur, Lautern; Wolfgang Diemer, Waldstetten, both of Fed. Rep. of Germany

[73] Assignee: Schenk Filterbau GmbH, Waldstetten, Fed. Rep. of Germany

[21] Appl. No.: 271,716

[22] Filed: Jun. 8, 1981

[30] Foreign Application Priority Data

Jun. 18, 1980 [DE] Fed. Rep. of Germany ....... 3022644
Jun. 18, 1980 [DE] Fed. Rep. of Germany ....... 3022658

[51] Int. Cl.³ .............................................. B01D 29/02
[52] U.S. Cl. ..................................... 210/91; 210/383; 210/397
[58] Field of Search ..................... 366/138, 139, 185; 68/208; 435/311, 316, 317; 210/179, 232, 236, 241, 249, 368, 369, 375, 380 V, 383, 415, 416.1

[56] References Cited

U.S. PATENT DOCUMENTS

| 30,649 | 7/1878 | Thomspon | 366/185 |
|---|---|---|---|
| 1,043,939 | 11/1912 | Isherwood | 210/179 |
| 1,260,887 | 3/1918 | Edgerton | 210/179 |
| 1,567,990 | 12/1925 | Apablasa | 210/179 |
| 1,898,604 | 2/1933 | Twiss et al. | 366/185 |
| 3,980,560 | 9/1976 | Eades | 210/232 |
| 4,014,497 | 3/1977 | Spiewok | 210/380.1 |

FOREIGN PATENT DOCUMENTS

| 7832951 | 9/1979 | Fed. Rep. of Germany . |
|---|---|---|
| 2276858 | 1/1976 | France . |
| 1190456 | 5/1970 | United Kingdom . |
| 2034190 | 6/1980 | United Kingdom . |

Primary Examiner—John Adee
Attorney, Agent, or Firm—Benoit Law Corporation

[57] ABSTRACT

A filtration apparatus comprises a tiltably mounted container having a liquid permeable filter bottom, a wall opposite such bottom, and an inverted neck extending inwardly from that opposite wall. A power shaft extends through the inverted neck into the container and carries a mixing implement in the container. A guide bearing for the power shaft is located in the inverted neck. A drive for the mixing implement is supported on the container wall opposite the filter bottom for driving the power shaft. A lifting mechanism connected to said power shaft is also supported by that opposite wall for axially displacing the power shaft and mixing implement in said container. A support bearing at one side of the container and the frame has an apertured part rotatable with the tiltable container. Conduits are conducted through the apertured part for angular movement with the container, thereby avoiding a tangling of lines.

15 Claims, 5 Drawing Figures

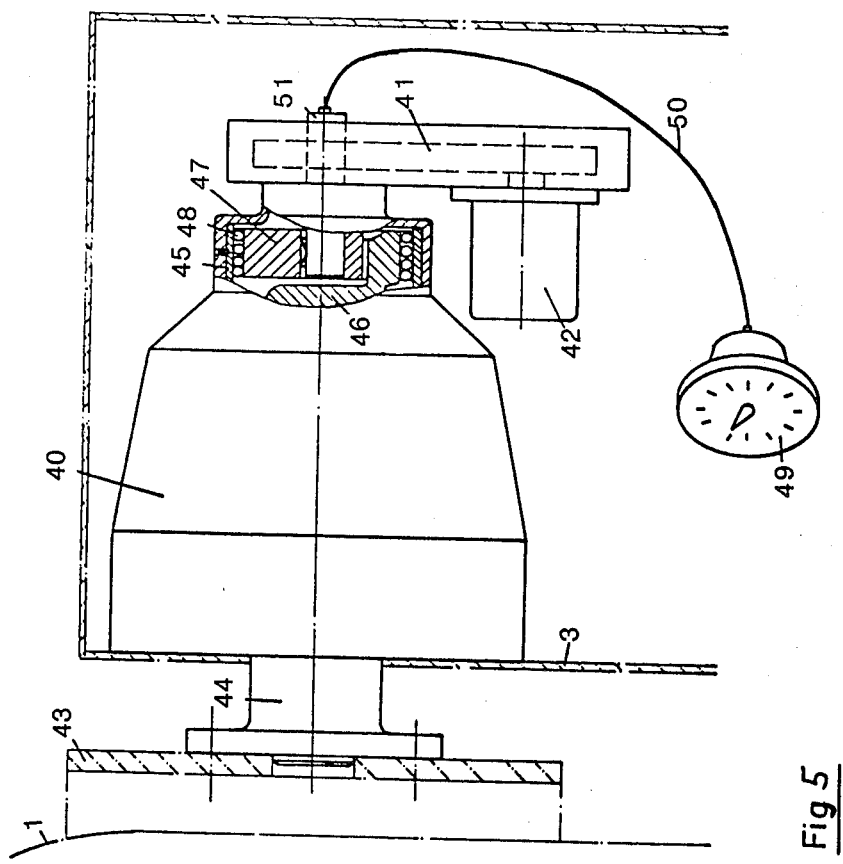

4,417,980

FILTRATION APPARATUS

BACKGROUND OF THE INVENTION

1. Field of the Invention

The subject invention relates to filtration apparatus, to process filters, and to apparatus and systems for filtering and drying various materials.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also the following comments contain conclusions and observations which have only been drawn or become apparent after conception of the subject invention or which contrast the subject invention or its merits against the background of developments which may be subsequent in time or priority.

Filtration apparatus or processing filters of the type herein disclosed have been widely used in various industries. For instance, in the chemical industry such processing filters are frequently employed where materials or products are to be separated, filtered, washed, suspended, extracted and/or crystallized, or subjected to a similar operation.

Such processing filters have particular utility in the pharmaceutical industry, where they may, for example, be employed for the preparation of base materials for medicines, pills, powders and the like, as well as for the filtration, washing, crystallization, drying or other processing of various materials and solutions.

Processing filters of this type have an axially symmetrical container which is heatable and is tiltably positioned in a frame. The bottom of such container is provided with a filter permeable to liquids and a powered mixing shaft which is positioned in the longitudinal direction of the container and is adjustable in axial direction by means of a lifting mechanism. The mixing shafts is provided with mixing implements inside the container.

Whereas the filtering and possibly the washing process can be executed in a given container position, the container is typically tilted into a different position for the drying process. Prior-art containers were provided with a support bearing which carried the mixing mechanism, the drive unit and the lifting mechanism for the mixing shaft. However, this arrangement resulted in an excessive total height of the assembly, which was bothersome, particularly during tilting of the container. An additional problem resides in a caking of the processed materials to the mixing mechanism and in particular to the mixing shaft, resulting from the heating effect during the drying process. Caked-on materials had to be removed in a troublesome procedure after the discharge of the product. In addition, this often resulted in a substantial loss of materials.

Furthermore, problems occurred during the tilting process with respect to the arrangement of the numerous requite inlets and outlets of the processing filter, such as the supply and elimination lines for fuel, condensation runoff, filtrate outflow and product supply which all became entangled.

It is already known that placing the stuffing box for the mixing shaft as a rotary structure into an opening into the inside of the container avoids the caking of solid products. Because of this measure the mixing shaft despite rounded container could still be completely inserted into the stuffing box thus avoiding caking. However, since the support bearing was still placed onto the container, the disadvantage of an excessive height of the assembly remained.

For this reason it was already proposed in the German Utility Model No. 78 32 951, German Published patent application No. 28 48 109, and British Published patent application No. 79 26 952, Specification No. 20 34 190, to arrange the support bearing in a container neck within the container itself. According to this proposal, the support bearing is flanged to the lower, plane surface of the neck.

The upper boundary of the bearing slightly extends over the upper container wall. The axial forces are being absorbed by the support bearing at the lower, plane surface of the neck of the container, whereas the seating of the mixing shaft itself takes place between the mixing shaft and the support bearing.

It is disadvantageous, however, that the complete vertical forces which result from the lifting mechanism, the power drive unit and the mixing device itself have to be absorbed by the lower, plane surface of the container neck. An additional disadvantage resides in the fact that the mixing apparatus during operation generates a rotating flexural torque on the lower surface of the neck of the container resulting in substantial stress to the container neck and the container itself. In addition, the accessability to worn parts was poor.

A problem regarding the arrangement of lines existed with respect to requisite tilting of the container. The resulting tangling of lines not only had a negative effect on the performance of the device but it also represented a danger to operating personnel.

For the purpose of tilting the container, an adjustable rack in the apparatus frame meshing with a pinion connected to the shaft of the container was generally provided. Depending on the length of the rack, a certain tilt could thus be achieved. There was, however, a problem with the prior art tilting devices whenever the container was to be fixed in a particular position. In this case the rack would have to bear the total load. The rack generally was moved hydraulically. For this reason, maintaining a tilted position for a longer period of time by means of the hydraulic device alone was not possible since unavoidable leakage losses occurred.

Therefore, a mechanical safety device had to be provided for the more defined positions. It consisted of a bolt inserted into notch-like bores which were arranged accordingly in a part of the container wall and the frame.

This arrangement was disadvantageous, since the container could only be moved in predetermined steps, that is according to the provided bores. The release of the bolt under tension was also problematic.

SUMMARY OF THE INVENTION

It is a general object of the invention to overcome the disadvantages and meet the needs expressed or implicit in the above disclosure statement or in other parts hereof.

It is a germane object of the invention to provide improved filtration apparatus and processing filters.

It is a related object of the invention to provide, in processing filters, a relatively lower over-all height of the assembly, a mixing apparatus that will remain free of caked-on solid matter, while retaining a container simple in its design. In particular, the container is not to be subjected to impairing or interfering flexural torque and worn parts should be easily accessible. In addition, tilting in a simple manner should be possible continuously in a wide range, if necessary up to 360°.

It is also an object of the invention to avoid the use of support bearings of the above mentioned type.

From a first aspect thereof, the invention resides in filtration apparatus comprising, in combination, a tiltably mounted container having inlet and outlet means a liquid permeable filter bottom situated between said inlet and outlet means, a wall opposite that bottom, and a neck extending inwardly from that opposite wall, and mixing means including a power shaft extending through that neck into the container and carrying a mixing implement in the container, a guide bearing for the power shaft in the neck, a drive supported at the mentioned opposite wall for driving the power shaft, and a lifting mechanism connected to the power shaft and supported by the mentioned opposite wall for axially displacing the power shaft and mixing implements in the container.

From another aspect thereof, the invention resides in filtration apparatus comprising, in combination, a container having inlet and outlet means, and a liquid permeable filter bottom situated between said inlet and outlet means, mixing means including a power shaft extending into the container from a side opposite the filter bottom and carrying a mixing implement in the container, a drive for the power shaft and a lifting mechanism for axially displacing the power shaft, a supporting frame, means for tiltably mounting the container, including a support bearing at one side of the container and the frame, including several roller elements and an inner roller engaged by the roller elements, the inner roller having spaced-apart apertures, and conduits leading through the spaced-apart apertures in the inner roller to and from said container for angular movement therewith.

From still another aspect thereof, the invention resides in filtration apparatus comprising, in combination, a tiltably mounted container including inlet and outlet means, and having a liquid permeable filter bottom situated between the inlet and outlet means, mixing means including a power shaft extending into the container from a side opposite the filter bottom and carrying a mixing implement in the container, a drive for the power shaft and a lifting mechanism for axially displacing the power shaft, a tilting mechanism for the container including a planetary gear, and stepless means connected to the container for arresting said tiltably mounted container in any tilted position, including a locking brake with an automatic locking device in said planetary gear for the setting and maintenance of a specific angle of tilt.

BRIEF DESCRIPTION OF THE DRAWINGS

The invention and its various aspects and objects will become more readily apparent from the following detailed description of preferred embodiments thereof, illustrated by way of example in the accompanying drawings in which like reference numerals designate like or functionally equivalent parts, and in which:

FIG. 5 is an enlarged detail view of the tilting mechanism used in the apparatus of FIG. 1.

DESCRIPTION OF PREFERRED EMBODIMENTS

Figure 1:
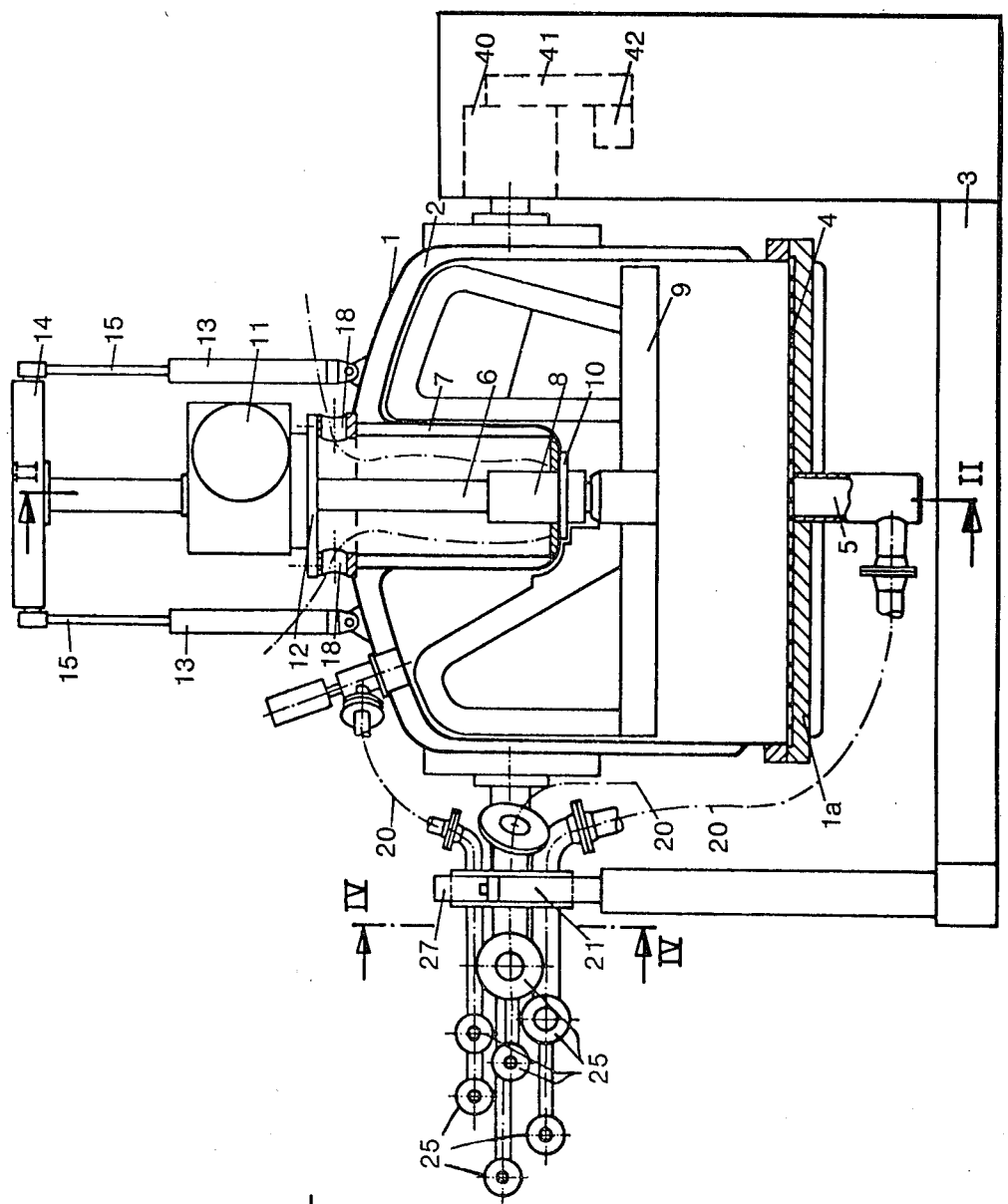
FIG. 1 is an elevation, partially in section, of a processing filter according to a preferred embodiment of the invention.

FIG. 1 shows a filtration apparatus or processing filter in the position in which a product to be processed is being filtered. The processing filter includes a container 1 which has a heating jacket 2 and is tiltably mounted in a frame 3. In the inside of the container there is provided a liquid permeable bottom 4 having an outlet 5 which may be connected to a vacuum device and filtrate outflow line. A mixing apparatus power shaft 6 extends from a container wall located opposite the filter bottom into the inside of the container. At that point the container is provided with an inverted container neck 7 extending inwardly into the latter opposite container wall. The container neck 7 is provided with a central bore or hole at its lower end through which a guide bearing 8 for the mixing shaft 6 is inserted or extends. At its lower free end, the mixing shaft 6 carries a mixing implement which is attached thereto and preferably includes helicoid blades which wipe all heated contact surfaces, such as the container neck, heating jacket, bottom of the container, and the lower part of the container neck, and which stir and turn over the drying product.

The mixing apparatus is adjustable in its axial direction by means of a corresponding longitudinal or axial displacement of the power shaft 6. The container neck 7 is provided with a plane surface at its lower end extending transversely to the longitudinal axis of the power shaft 6 or of the downwardly extending neck 7.

The guide bearing 8 has an annular portion or collar 10 abutting the latter plane surface from the inside of the container. For the purpose of sealing, the collar 10 is provided with a static seal 33. The collar 10 serves the purpose of attachment of the guide bearing 8 to the container neck 7. Since this attachment takes place from below, that is from the inside of the container, the shaft 6 and the guide bearing 8 can easily be disassembled upon removal of the lower bottom part 1a without any need for a disassembly of the power shaft driving and displacing apparatus on the container.

For an increase of the effective heating surface, the container neck itself advantageously may also be provided with a heating jacket. The mixing implements 9 are preferably shaped in such a way that they can wipe or brush by the container wall as well as the container neck 7.

A geared motor 11 is provided as power drive unit for the mixing shaft 6 which is connected to the upper wall of the container by means of a bearing ring or ring bearing 12. FIG. 1 thus shows the motor 11 flanged directly to the container wall 1. The ring structure has several apertures 18 in its circumference through which inlet and outlet lines to and from the inside of the hollow container neck 7 are insertable. Thus, as shown by dotted lines, heating and/or cooling lines and flushing pipes for the seals and lines for a blocking medium for the buildup of pressure can be inserted into the ring structure 12 for the benefit of the guide bearing 8.

The adjustment of the mixing shaft 6 in longitudinal direction takes place by means of a lifting mechanism connected to the power shaft 6 and supported by the top or wall of the container 1 opposite the filter bottom 1a, for axially displacing the power shaft and mixing implements 9 in the container. The lifting mechanism may have two or more hydraulic cylinders 13 attached to or mounted on the latter opposite wall of the container. One or more cross beams are connected to pistons or piston rods 15 of the hydraulic cylinders 13 and are connected to or mount the power shaft 6.

After the filtration process and possibly after a washing of the product, the container 1 is being tilted; preferably continuously or in a stepless manner and up to 180° as desired or necessary. Simultanteously, the power shaft 6 is brought into the retracted position already shown in FIG. 1, where it is fully inserted into the neck of the container 7. The level of the product to be dried is provided or adjusted so that it does not exceed the height of the neck of the container.

Figure 2:
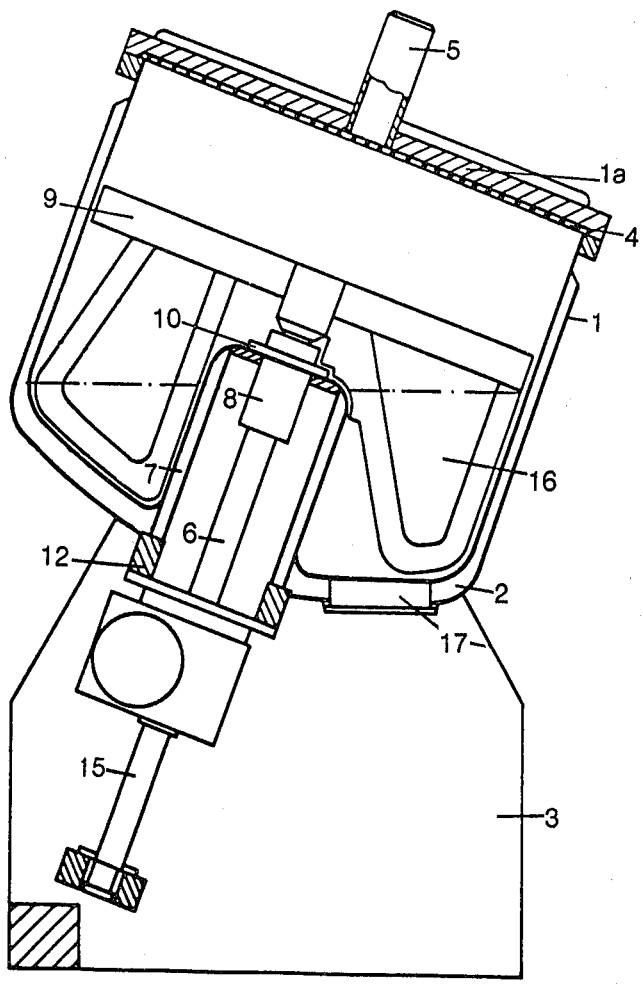
FIG. 2 is a section taken along the line II—II in FIG. 1 and showing the container assembly in a tilted position.

After this tilting process, the product to be dried is now in an annular compartment 16 at a level indicated by dotted line in FIG. 2, showing an effected tilting of almost 180° as having taken place.

After completion of the drying process, the product can be removed through an outlet 17 which is now positioned on the lower side since the tilting motion has been carried out.

Figure 3:
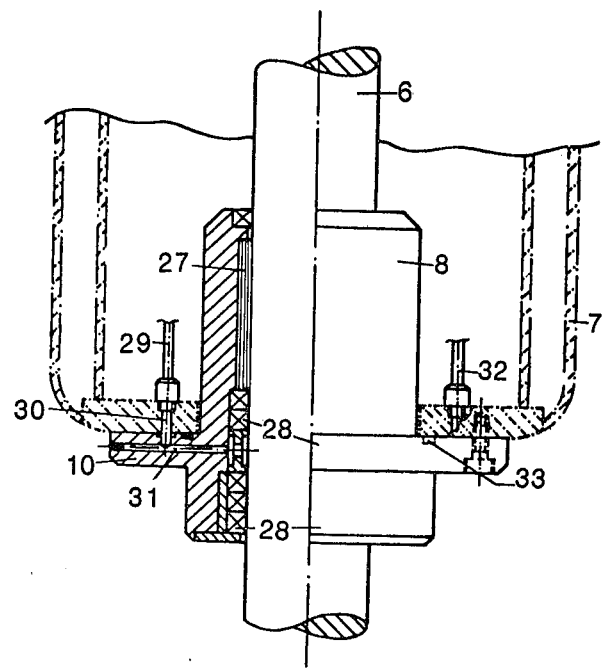
FIG. 3 is a longitudinal cross-section through a bearing employed in the apparatus of FIG. 1.

FIG. 3 presents an enlarged longitudinal cross section of the guide bearing 8. The power shaft 6 is guided by a slide bearing 27 and is sealed from the inside of the container by seals 28. The guide bearing 8 is connected by means of the collar 10 to the bottom of the neck 7 of the container and may be fastened thereto by screws. Flushing fluids can be delivered to the seals 28 by means of a pipe 29 and bores 30 and 31 at the bottom of the container neck and/or collar. A return may take place through line 32.

Figure 4:
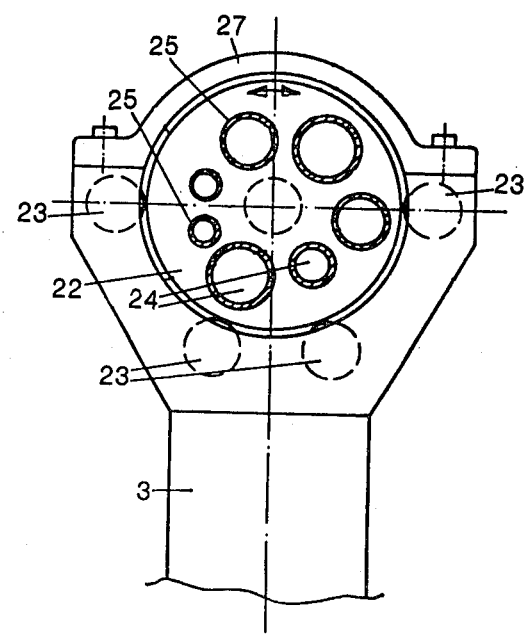
FIG. 4 is a section of the support roller bearing taken along the line IV—IV in FIG. 1.

FIG. 4 illustrates the preferred lead-in arrangement for supply and return lines 20 relative to the container 1, employing in part dotted lines. According to the illustrated preferred embodiment of the invention, the means for tiltably mounting the container include a support roller bearing 21 shown at the left side of FIG. 1 as including several roller elements 23 distributed over part of the circumference of an apertured rotatably inner part or roller 22 and mounted in frame 3. In this manner, the apertured inner roller or disk 22 is rotatable together with the tiltable container 1.

The inner roller 22 is provided with spaced-apart apertures 24 through while fittings 25 of conduits leading through the apertured roller 22 to and from the container 1 are inserted for angular movement with such tilting container. The fittings 25 are thus rotating together with the container 1, whereby the pipe connections only on the outside are subjected to an angular motion essentially around their own axes or about a minimum circular trajectory.

The lines and hoses which are externally connected to the conduits or fittings 25 are thus changing their positions only minimally during an 180° tilting motion of the container 1, and the lines 20 which lead on the inside from the fittings 25 to the container do not change their relative position to the container 1 at all. This measure avoids the tangling of lines during the tilting process entirely. For the purpose of protection, the inner roller 22 is covered with a stationary cover 27 which extends over part of the inner roller and which is connected to the frame 3.

FIG. 5 demonstrates the principle of the tilting mechanism.

According to the preferred embodiment of the invention illustrated in FIG. 5, the tilting mechanism is composed of a planetary gear 40, a chain drive 41 and a hydraulic motor 42 with dual shock absorbing protection.

A tilting shaft 44 is attached to a console or mounting bracket 43 of the container 1 and is rotatably mounted on the frame 3. The planetary gear 40 which is mounted in the frame 3 is connected to the tilting shaft 44. The planetary gear is equipped with an integrated locking brake which may be of standard construction. The brake is provided with a brake drum 45 which is braced against the housing. A part 46 of the planetary gear is form closed but connected with some play to the body of the brake 47. The body of the brake 47 itself is tightly connected to a gear shaft 51.

A multitude of braking elements 48 are arranged in a clearance between the brake drum 45 and the body of the brake 47 and the gear part 46. If the hydraulic motor 42 stops at the end of a container tilting operation, the container exerts a torque moment on the gear part 46. Due to the play between the gear part 46 and the body of the brake 47, a relative motion between the two parts occurs, whereby the braking elements 48 are radially displaced and braced, thereby acting automatically as a slip free locking brake by pressing against the brake drum 45.

Since the tilting mechanism is entirely integrated in the supporting frame, tilting angles of 360° are feasible.

For safety purposes the tilting mechanism can be equipped with a hydraulic locking device which will inhibit an actuation of the lowering mechanism of the container bottom when the tilting device has left its basic or lowermost position.

As shown in FIG. 5, the tilting device may be provided with an angle indicator 49 that indicates the angle of tilt of the container 1. This allows a predetermined choice of the optimal drying position according to the product to be processed. For this purpose the device 49 may be connected via a flexible shaft 50 to the gear shaft 51, whereby for an indication of the container tilting angle only the gear ratio at 40 has to be taken into account.

A safe and wide range of tiltability of the container is achieved by the preferred embodiment of the invention herein disclosed.

A support bearing is no longer used. Rather, according to the invention, the mixing apparatus 9, the power drive unit 11, the lifting mechanisms 13, 14 and 15 and possibly additional devices are supported by the wall of the container 1 itself. The rear or upper end of the mixing shaft 6 is also seated in this area. According to the invention the front end of the mixing shaft is guided in the neck 6 of the container by means of a guide bearing 8. In this manner, the neck 7 of the container remains free of flexural torque and vertical forces created by the lifting mechanism. Only transverse forces occur in the guide bearing. Forces and loads can be absorbed directly by the container without appreciable flexural torque.

This solution provides a lower overall height of the assembly on one hand, and caking of solid matter to the mixing shaft is avoided on the other, since the mixing shaft 6 can be completely inserted into the inverted container neck 7.

A further advantageous development of the invention consists of the fact that the neck 7 of the container is provided with a plane surface situated transversally to the longitudinal axis of the mixing device. To this surface, a collar 10 of the guide bearing is attached from the inside of the container, providing a means for attaching the bearing housing to the neck of the container.

Because the housing of the slide bearing 8 is attached from the inside of the container, this device can be easily assembled or disassembled. Only the lower bottom of the container has to be removed and the power drive unit 11, the lifting mechanism 14 and their accessories do not have to be disassembled or dismounted.

Because of the support roller bearing 21, which also is provided with several rollers 23 distributed over the circumference of an inner roller or disk 22, it is no longer necessary that the supply and return lines have to travel long distances during the tilting process of the container. The insertion of the lines takes place through apertures into the inner roller 22, thus the conduit fittings, with the exception of minimum circular motions, rotate only around their own axis.

Since the inner roller 22 is turning along with the lines leading to or coming from the container, these lines have no relative motion with respect to the container 1. For this reason any tangling of lines during the tilting process is eliminated. It is thus possible to work comfortably and without danger. Because of this lack of motion of the lines, their life is enormously increased. In contrast to the prior-art rotatable insering systems and their problematic but necessary dynamic seals, all lines, according to the invention, are provided with static seals thus providing a large degree of operational safety. The very short lines also guarantee that only small amounts of the product will be displaced. In addition, good accessability is provided.

If the container 1 can be adjusted continuously as provided by an additional characteristic of the invention, it can be tilted to the optimum angle according to the necessities of industrial processing engineering, thus achieving a high degree of economy.

When changing a procedure or a product, an adaptability is already given by the continuous adjusting possibility, independent from the point in time such an adjustment is necessitated.

For the purpose of adjusting or maintaining a specific angle of tilt, a locking brake 45 to 48 can be provided in a simple manner. This locking brake can either be form-closed or frictionally connected. It can also be arranged between the gears 40 and a power drive, such as a chain drive, or it can be immediately connected to the power drive unit 42 itself.

It is advantageous if the locking brake 45 to 48 is provided as an automatically acting mechanical locking brake for both directions. It is best if this locking brake is not switched directly with the braking itself. This guarantees a safe maintenance of any desired angle of tilt thus eliminating an uncertainty factor which an activation of the brake might present.

A very advantageous embodiment is given by providing the tilting mechanism with a basically known planetary gear and an integrated locking brake.

Since it is possible to achieve a safe blocking of the container or any desired position without necessitating a connecting element such as a clutch between the gears and the braking system, this arrangement provides a high degree of operation safety. For the planetary gear 40 a hydraulic motor 42 can be provided as a power drive.

In addition it is advantageous if an indicating device 49 is provided for the purpose of indicating and adjusting the angle of tilt of the container 1. A simple possibility of monitoring the tilting process of the container is thus provided by this angle indicator device. This monitoring activity can take place at a centrally located control desk. There, specific markings, indicators or contacts can be provided with regard to the specific optimum angle of tilt depending on the product, the amount, and the like.

Various modifications and variations within the spirit and scope of the subject invention will become apparent or suggest themselves to those skilled in the art on the basis of the subject extensive disclosure.

We claim:

1. Filtration apparatus comprising in combination:
   a container having inlet and outlet means, and a liquid permeable filter bottom situated between said inlet and outlet means;
   mixing means including a power shaft extending into said container from a side opposite said bottom and carrying a mixing implement in the container, a drive for said power shaft and a lifting mechanism for axially displacing said power shaft;
   a supporting frame;
   means for tiltably mounting said container, including a support bearing at one side of said container and said frame, including several roller elements and an inner roller engaged by said roller elements, said inner roller having spaced-apart apertures; and
   conduits leading through said spaced-apart apertures in said inner roller to and from said container for angular movement therewith.

2. Filtration apparatus comprising in combination;
   a tiltably mounted container including inlet and outlet means, and having a liquid permeable filter bottom situated between said inlet and outlet means;
   mixing means including a power shaft extending into said container from a side opposite said bottom and carrying a mixing implement in the container, a drive for said power shaft and a lifting mechanism for axially displacing said power shaft;
   a tilting mechanism for said container including a planetary gear; and
   stepless means connected to said container for arresting said tiltably mounted container in any tilted position, including a locking brake with an automatic locking device in said planetary gear for the setting and maintenance of a specific angle of tilt.

3. Filtration apparatus as claimed in claim 8 or 12, wherein:
   said tiltably mounted container has a wall opposite said liquid permeable filter bottom, and a neck extending inwardly from said opposite wall; and
   said power shaft extends through said neck into the container and has a guide bearing in said neck;
   said drive being supported at said opposite wall for driving said power shaft; and said lifting mechanism connected to said power shaft being supported by said opposite wall for axially displacing said power shaft and mixing implements in said container.

4. Filtration apparatus as claimed in claim 1, wherein said neck of the container has a hole at its lower end through which said guide bearing extends.

5. Filtration apparatus as claimed in claim 1, wherein said neck of the container has a plane surface extending transversely to a longitudinal axis of said power shaft, and said guide bearing has a collar abutting said plane surface from the inside of the container for an attachment of the guide bearing to said neck.

6. Filtration apparatus as claimed in claim 5, including a static seal at said collar.

7. Filtration apparatus as claimed in claim 1, wherein said lifting mechanism has hydraulic cylinders attached to said opposite wall and a cross beam connected to pistons of said hydraulic cylinders and mounting said power shaft.

8. Filtration apparatus as claimed in claim 1, wherein said drive has a geared motor connected to said opposite wall by a bearing ring.

9. Filtration apparatus as claimed in claim 8, wherein said bearing ring has apertures through which inlet and outlet lines to and from the inside of said neck of the container are insertable.

10. Filtration apparatus as claimed in claim 1, including a stationary cover extending over part of said inner roller and being connected to said frame.

11. Filtration apparatus as claimed in claim 2, including a hydraulic motor as a power unit for the planetary gear.

12. Filtration apparatus as claimed in claim 1 or 2, including an indicating device for indicating the angle of tilt of the container.

13. Filtration apparatus as claimed in claim 2, including means for mounting the container in the frame for a tilt up to 360°.

14. Filtration apparatus comprising in combination:
a tiltably mounted container having inlet and outlet means, a liquid permeable filter bottom situated between said inlet and outlet means, a container wall opposite said filter bottom, and a neck extending inwardly from said container wall and having a lower end inside the container, said neck having a plane surface with a hole at said lower end extending transversely to a longitudinal axis of said downwardly extending neck; and
means for mixing materials in said container, including a power shaft extending through said neck into said container and carrying a mixing implement in the container, a guide bearing for said power shaft, said guide bearing extending through said hole at said lower end of the neck and having a collar abutting said plane surface from the inside of the container, means for attaching said collar to said neck from the inside of the container, a drive for said power shaft having a motor flanged directly to said container wall, and a lifting mechanism connected to said power shaft and supported by said container wall for axially displacing said power shaft and mixing implements in said container, said lifting mechanism having hydraulic cylinders attached to said container wall and a cross beam connected to piston rods of said hydraulic cylinders and mounting said power shaft.

15. Filtration apparatus as claimed in claim 14, wherein:
said neck is hollow; and
said motor is flanged to said container wall by a ring structure having apertures leading to and from said hollow neck from and to the outside of said container.

* * * * *